(12) United States Patent
Elturki et al.

(10) Patent No.: US 12,373,727 B2
(45) Date of Patent: Jul. 29, 2025

(54) SYSTEM AND METHOD FOR DISTRIBUTED LEARNING

(71) Applicant: Kabushiki Kaisha Toshiba, Minato-ku (JP)

(72) Inventors: Abdussalam Ahmed Elturki, Bristol (GB); Aftab Khan, Bristol (GB)

(73) Assignee: Kabushiki Kaisha Toshiba, Minato-ku (JP)

(*) Notice: Subject to any disclaimer, the term of this patent is extended or adjusted under 35 U.S.C. 154(b) by 749 days.

(21) Appl. No.: 16/045,099

(22) Filed: Jul. 25, 2018

(65) Prior Publication Data

US 2020/0034747 A1  Jan. 30, 2020

(51) Int. Cl.
*G06N 20/00* (2019.01)
*G06N 5/02* (2023.01)

(52) U.S. Cl.
CPC ............... *G06N 20/00* (2019.01); *G06N 5/02* (2013.01)

(58) Field of Classification Search
CPC .................................. G06N 5/02; G06N 20/00
See application file for complete search history.

(56) References Cited

U.S. PATENT DOCUMENTS

| | | | | |
|---|---|---|---|---|
| 8,874,440 B2* | 10/2014 | Park | ......................... | G10L 25/78 704/251 |
| 10,152,676 B1* | 12/2018 | Strom | ..................... | G06N 3/084 |
| 2011/0004453 A1* | 1/2011 | Engelsen | ............. | G01R 33/465 703/2 |
| 2015/0324690 A1* | 11/2015 | Chilimbi | ................ | G06N 3/063 706/27 |
| 2017/0098171 A1 | 4/2017 | Kumar et al. | | |
| 2018/0336458 A1* | 11/2018 | Tomioka | ................. | G06N 3/08 |

OTHER PUBLICATIONS

Chen et al., "Adaptive Residual Gradient Compression for Data-Parallel Distributed Training", Dec. 2017, Association for the Advancement of Artificial Intelligence (Year: 2017).*
Li et al., "Scaling Distributed Machine Learning with the Parameter Server", Oct. 2014, USENIX Association (Year: 2014).*
Wang, "When Edge Meets Learning: Adaptive Control for Resource-Constrained Distributed Machine Learning", 2018 (Year: 2018).*
Jeffrey Dean et al., "Largescale Distributed Deep Networks", NIPS, 2012, 9 pages.
Corentin Hardy et al. "Distributed Deep Learning on Edge-Devices: Feasibility via Adaptive Compression", CoRR, vol. abs/1702.04683, 2017, 8 pages.

* cited by examiner

*Primary Examiner* — Van C Mang
(74) *Attorney, Agent, or Firm* — Oblon, McClelland, Maier & Neustadt, L.L.P.

(57) ABSTRACT

A computer implemented method of distributed learning in a system comprising a parameter server configured to maintain a global parameter set of a model to be trained and a plurality of workers. The method comprises transmitting a current global parameter set to a worker. The worker performs a training step based on training data available to the worker, thereby generating a local set of parameters of the model, determines a likelihood of the local set of parameters being suitable for improving the global parameter set and omits transmission of the local set of parameters to the parameter server if it is determined that the local set of parameters is not likely suitable for improving the global parameter set.

11 Claims, 3 Drawing Sheets

SYSTEM AND METHOD FOR DISTRIBUTED LEARNING

FIELD

Embodiments described herein relate generally to a system and method of distributed learning, preferably deep learning, using a decision process in an edge device to decide if locally trained learning parameters should be transmitted to a parameter server.

BACKGROUND

A neural network (NN) is a machine learning tool that works by simulating many interconnected processing units that resemble abstract versions of human brain neurons. The processing units are arranged in layers. There are typically three parts in a NN model: an input layer, with units representing the input fields, hidden layers, and an output layer, with a unit or units representing the target field(s). The units are connected with varying connection weights and biases. The connection weights and biases are the parameters of the NN model. Input data are presented to the first layer, and values are propagated from each neuron to every neuron in the next layer. Eventually, a result is delivered from the output layer. Neural networks that comprise multiple hidden layers are referred to as Deep Neural Networks (DNN).

In some neural networks all weights are randomly initialised and biases are set to 0. The network learns through training process with gradient descent optimization method for minimizing a cost function that may be non-convex. The cost function is a measure of a neural network performance with respect to its given training sample and the expected output. At the time of writing a popular gradient descent optimization method is Stochastic Gradient Descent (SGD). It is a stochastic approximation of the gradient descent optimization and iterative method for minimizing an objective function.

In the following, embodiments will be described with reference to the drawings in which.

DETAILED DESCRIPTION

Figure 1:
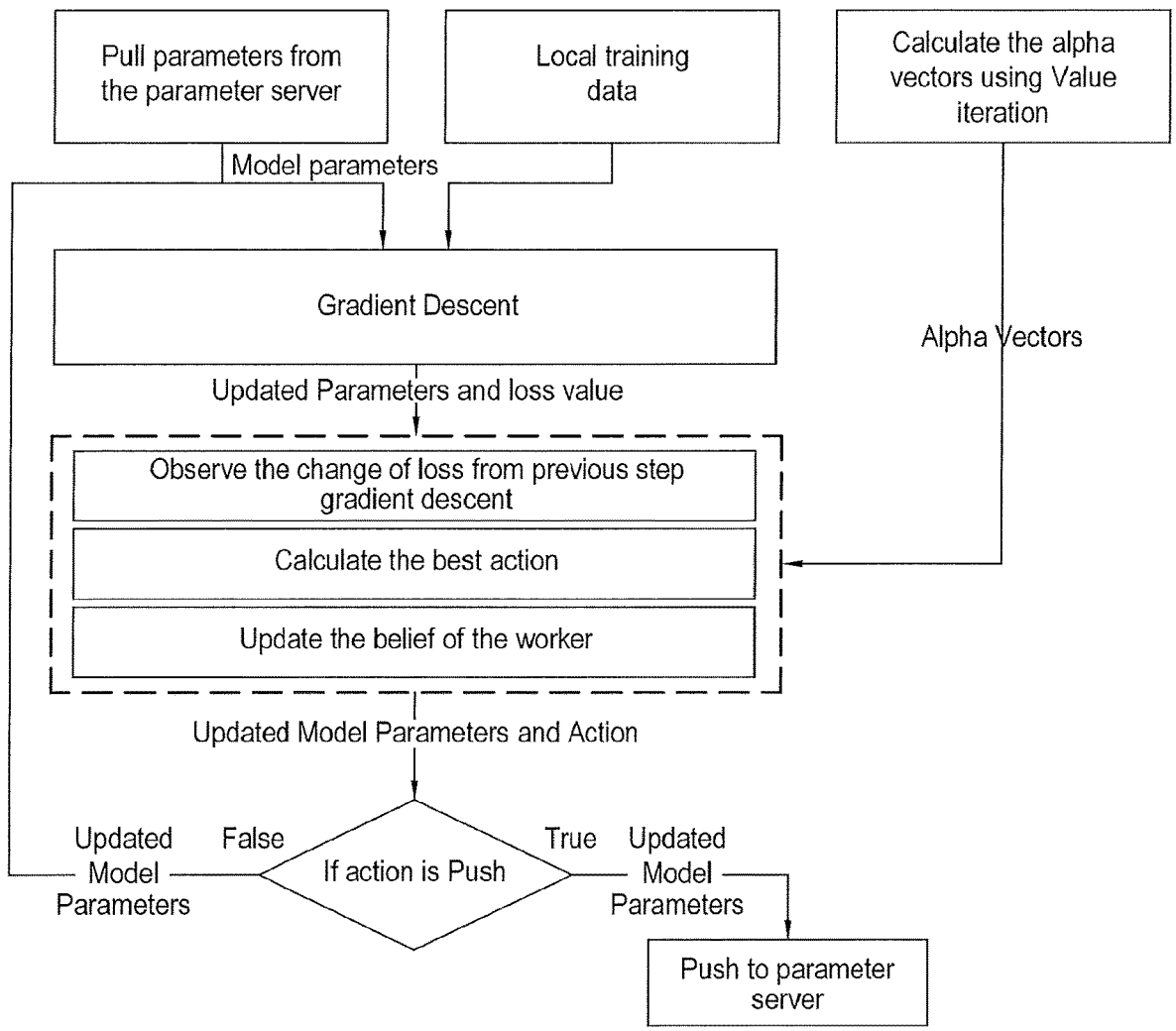
FIG. 1 illustrates a method according to an embodiment.

According to an embodiment there is provided a computer implemented method of distributed learning in a system comprising a parameter server configured to maintain a global parameter set of a model to be trained and a plurality of workers. The method comprises transmitting a current global parameter set to a worker. The worker performs a training step based on training data available to the worker, thereby generating a local set of parameters of the model. The worker determines a likelihood of the local set of parameters being suitable for improving the global parameter set and omitting transmission of the local set of parameters to the parameter server if it is determined that the local set of parameters is not likely suitable for improving the global parameter set.

In an embodiment the method is Asynchronous Stochastic Gradient Descent and receives local parameter set updates from a number of workers performing local training.

The worker may use the local set of parameters as starting parameters in a further training step if it is determined that the local set of parameters is not likely suitable for improving the global parameter set.

If it is determined that the local set of parameters is likely suitable for improving the global parameter set, the worker may transmit the local set of parameters to the parameter server, receive an updated global parameter set from the parameter server and use the updated global parameter set as starting parameters in a further training step.

The determining may be based on a Partially Observable Markov Decision Process and wherein a loss function or learning curve of the training step is used as observation.

The worker may use reinforcement learning for said determining.

According to another embodiment there is provided a non-transient data carrier comprising a computer program instructions suitable for execution by a processor, the computer program instructions, when executed by the processor causing the processor to perform any of the aforedescribed methods.

According to another embodiment there is provided a distributed learning computer system comprising a parameter server configured to maintain a global parameter set of a model to be trained and a plurality of workers. The parameter server is configured to transmit a current global parameter set to workers. One or more of the workers are configured to independently perform a training step based on training data available to the worker and on a global parameter set received from the parameter server, thereby generating a local set of parameters of the model, to determine a likelihood of the local set of parameters being suitable for improving the global parameter set and to omit transmission of the local set of parameters to the parameter server if it is determined that the local set of parameters is not likely suitable for improving the global parameter set.

The worker may further be configured to, if it is determined that the local set of parameters is likely suitable for improving the global parameter set, transmit the local set of parameters to the parameter server and the parameter server may further be configured to update the global parameter set on the basis of a local parameter set received from the worker.

According to another embodiment there is provided a device comprising a processor, memory storing instructions executable by the processor and a communication interface the instructions cause the processor, when executed by the processor to perform a training step for a distributed learning system, the training step uses training data available to the worker and a copy of a global parameter set of the distributed learning system received through the communication interface, thereby generating a local set of parameters of the model, determine a likelihood of the local set of parameters being suitable for improving the global parameter set and omit transmission of the local set of parameters to the parameter server if it is determined that the local set of parameters is not likely suitable for improving the global parameter set.

With the increase of computational power of smart devices it is possible to perform training on edge devices without sending the raw data to a centralised server. Learning on edge devices has the benefit of low-latency inference and increased privacy but however, with increase of scalability there will be increase in communication costs (both in terms of energy consumption and in monetary terms) and a need for a reliable connection.

Distributed DNN can be implemented using Asynchronous Stochastic Gradient Descent (ASGD), where the setup includes number of workers and a parameter server. In a known process the server initialises the parameters of a global DNN model. The workers can request to receive (pull) the global DNN model and train the thus created local copy of the DNN model based on locally available training data and using gradient descent. The parameters of the updated locally DNN are uploaded to the parameter server. When the parameter server receives a local model from a worker, the server updates the global model using that new model in same way Stochastic Gradient Descent updates model parameters. The process does not require any of the workers to wait for each other to finish their training process and is therefore often referred to as assynchronous.

A known approach requires the workers to send the updated/newly trained parameters of the locally stored DNN to server, even if the newly trained parameters produce no improvement in the performance of the global model or even if the newly trained parameters are likely lead to deterioration in performance if used as part of the global model. Transmitting newly trained parameters requires constant communication between the parameter server and the worker, which may be compromised if the transmission connection is not reliable. It was realised that this problem would be alleviated if newly trained parameters that do not contribute or are unlikely to contribute to an improvement in the performance of the global model were not sent to the parameter server.

| Table of definitions of terms | |
|---|---|
| Term | Definition |
| Parameter Server | A server that has the global model. |
| Worker | The end device that does Neural Network Training. |
| Parameters | collection of Weights and bias that used in Neural Network. |
| Pull | The action of requesting to receive the global from parameter server. |
| Push | The action of sending new parameters to the parameter server. |
| Train | The action of continuing the training process of the worker. |
| Observation | Observation of cost function that the worker has made after training. |
| Belief | denotes the probability that environment is in certain state. |

The new method of an embodiment addresses these issues by using a method within the Reinforcement Learning group of algorithms as illustrated in FIG. 1. The algorithm assists in deciding whether the training performed by the edge devices was beneficial or not. If the training is deemed to have resulted in an improvement to the global model, then the worker transmits the updated model to the central server. The method is performed in a node/worker holding the local copy of the DNN. The parameters of the DNN used for starting a model training segment are acquired from the parameter server. The local node/worker also has access locally to a set of training data and trains the model using this data, for example using gradient descent. As a result new DNN parameters are generated. Given that the local worker does not have visibility of the global DNN it is not possible for the worker to directly decide whether or not the new parameters it has generated in the last training step would help to improve the overall performance of the global DNN. Reinforcement learning is used to enable the worker to decide whether or not to upload the newly trained parameters, or selected parts thereof, to the parameter server for participation in an update of the global DNN parameters.

It is reasonable to assume that the training of the global DNN follows a Markov decision process and, specifically, that any future states are not dependent on past states but only on a present state and on a chosen action. Markov decision processes are known and consequently do not need to be described in the present disclosure. The decision of whether or not a newly trained local set of parameters should be uploaded to the parameter server is taken locally in the worker that has trained its local copy of the DNN based on locally available training data.

It will be appreciated that a decision to omit sending of newly trained parameters, for example because the worker has determined that these new parameters are unlikely to improve the performance, reduces the data transmission bandwidth required between the worker and the parameter server as well as the dependence of the system on transmission link reliability. This should be compared to other approaches, for example data compression approaches, which, whilst reducing transmission bandwidth do not address concerns about the reliability of data transmission links.

It will be appreciated that the decision process cannot benefit from up-to-date information of the current state of the global DNN parameters as transmitting current parameters to the work would eradicate any bandwidth advantages that can be achieved by the embodiment. Consequently the worker has only access to incomplete information regarding the state of the model. Put in other words, the model for which upload decisions are made is only partially observable by the agent making the decision of whether or not to upload. In an embodiment the reinforcement learning algorithm that is used to operate within the worker is a partially observable Markov decision process (POMDP) as described in more detail below.

An action undertaken by the worker has a direct influence on the future of the environment. For example, a decision by the worker to upload newly trained parameters to the parameter server has two effects. Firstly the global model is updated to benefit from the training performed by the worker immediately. This allows dissemination of the training results to other workers more expediently. Secondly, the worker received updated global parameters immediately and can therefore operate on a parameter version that has benefitted from the training work undertaken by other workers. The decision of which action to take consequently has an impact on the future of the global model.

Actions taken in POMDPs have a value associated with them, the value reflecting the projected cumulative benefit provided by the trajectory of environmental states that can be adopted as a result of the action being taken. The decision made by the worker is the decision that maximises this value. Because the POMDP agent operating in the DNN worker cannot directly observe the current state of the global model underlying its decision this value cannot be determined directly. It is, however, known that, for POMDPs with a finite number of steps the horizon value function is piecewise linear and can be represented by a set of vectors, referred to in the following as alpha vectors. Each possible action has an alpha vector associated with it, with each alpha vector representing the benefit the associated action and including the trajectory of subsequent actions will have, depending on the current state of the environment. Given that the current environmental state is not known because of the only partial observability of the environment, a belief of which current state the environment is in is instead used in POMDPs. Based on a current belief of the environment it can be determined which of the alpha vectors provides the largest value (or, put in other words, maximises the likely future benefit to the environment). The worker chooses, as its next action, the action associated with the, for the current belief benefit maximising alpha vector by finding the alpha vector for which its dot product with the current belief vector is maximised.

To allow this determination the alpha vectors applicable to the environment are determined by the worker. This is done using value iteration, as described, for example, in R. D. Smallwood and E. J. Sondik, "The optimal control of partially observable markov processes over a finite horizon," *Operations Research*, vol. 21, no. 5, pp. 1071-1088, 1973, the entirety of which is incorporated herein by reference. In an embodiment value iteration uses, as a starting point for the alpha vectors, a matrix of known rewards (for taking a single action step) associated with an action a undertaken when the environment is in state s. This matrix is referred to as reward matrix and has the size of the number of possible actions x the number of possible states. The possible states of the environment are defined in a state set S, including the states of the newly trained DNN parameters providing:
  0: A major accuracy improvement,
  1: A moderate accuracy improvement, and
  2: A decline in accuracy,
The possible actions of the environment are defined in an action set A, including the actions:
  Train: The worker continues training its current local model.
  Push: The worker sends its local model to the parameter server.
At the time of initialisation of the alpha vector the believe vector is also initialised by assigning fixed initialisation values to it.

It will be appreciated that the benefit of an action is not only dependent on the action itself, so that the initialisation of the alpha vectors with the reward matrix can only represent a first step in the determination of the value associated with the action. Value iteration determines the benefit the trajectory of actions started by the next action to be chosen provides to the system and provides an indication of these benefits in the form of the mentioned alpha vectors using the probability of the environment transition between possible states (as encoded in a transition probability matrix T provided to the worker when the worker is pre-configured prior to commencement of the training operation), a matrix 0 indicating the probability of making an observation o in a new state s' after an action a has been performed.

The transition matrix T has the size of number of possible actions x number of possible states x number of possible states and contains the probabilities of transitioning to a state s' given the action a and the current state s.

The possible observations o are, in the embodiment:
  0: The difference in cost/learning of post and pre-training parameters is larger than a first threshold.
  1: The difference in cost/learning of post and pre-training parameters is smaller than the first threshold but larger than a second threshold that is different from the first threshold
  2 The difference in cost/learning of post and pre-training parameters is smaller than both thresholds.
The observation probability matrix O comprises the probabilities associated with the individual observations being made has a size of number of possible actions x number of possible states x number of possible observation.

Once determined the alpha vectors remain the same over subsequent training steps.

POMDP comprises 4 steps:
  The above discussed Value Iteration step,
  Observation,
  Action Selection, and
  Belief update.
The above mentioned belief comprises the probabilities of the environment being in the various different available states.

Turning to the first and second thresholds that determine which observation is made, the first and second threshold influence when the method determines that as a next step the worker should report the newly trained parameters to the parameter server (this is the case when the a large improvement in accuracy is to be expected, that is when the cost function is smaller than both thresholds or when a more modest improvement in accuracy can be expected, for example when the cost function is smaller than the first threshold but larger than the second threshold) or that a next step should be to continue training the local parameters, say because the cost function falls above the first threshold. In an embodiment the first and/or the second thresholds are chosen to adjust the frequency with which the worker reports to the parameter server.

Once the alpha vectors have been obtained training commences. The worker trains the local DNN and considers the loss function or learning curve associated with it when compared to the loss function or learning curve associated with the last set of parameters received from the parameter server. It is hereby not important how many training steps have taken place since these parameters have been received, given that the aim of the worker is to provide an improvement in accuracy for the global model and not for the last iteration of its own local model.

The worker determines which of the available actions to perform by identifying the action for which the dot product of belief and every alpha vector is maximised and carries on to perform the thus selected action.

The worker's belief gets updated depending on the latest action and observation. All possible states are independent, so the belief is updated to a new belief. In this the embodiment differs from other POMDP implementations in which the belief is updated using knowledge of the old belief, action and observation. In the embodiment in contrast the belief update only requires knowledge of the last action and observation. The belief is then updated probabilistically or deterministically from a set of available beliefs in which each possible observation has associated with it a believe and wherein the believe is selected based on the observation.

If the worker determines that the action that is to be performed is to further train (as opposed to push the trained parameters to the parameter server (action 0) then the worker will perform a further training step, using the next set of training data and perform the above described POMDP process a further time instead of pulling/receiving DNN parameters from the server. If it is determined that the next action to be performed is to transmit the learned DNN parameters then the worker pushes the new parameters to the parameter server. The worker then receives the up-to-date global model from the parameter server and bases the next training step on the updated training parameters.

In embodiments workers push updated model parameters only if the POMDP process suggests that the new parameters are likely to increase the accuracy of the global model. This will reduce the amount of communication between the server and worker, and can lower the cost of communication and need for reliable connection.

The performance of the embodiment was evaluated when compared with known asynchronous stochastic gradient descent methods (the results of which are labelled ASGD in the FIGS. 2 to 4) by simulating a convolutional neural network (CNN) for classifying handwritten numbers (the training data used was the MNIST handwritten images set). The CNN comprises an input layer, two convolutional layers, two subsampling layers, two fully connected dense layers and an output layer.

Figure 2:
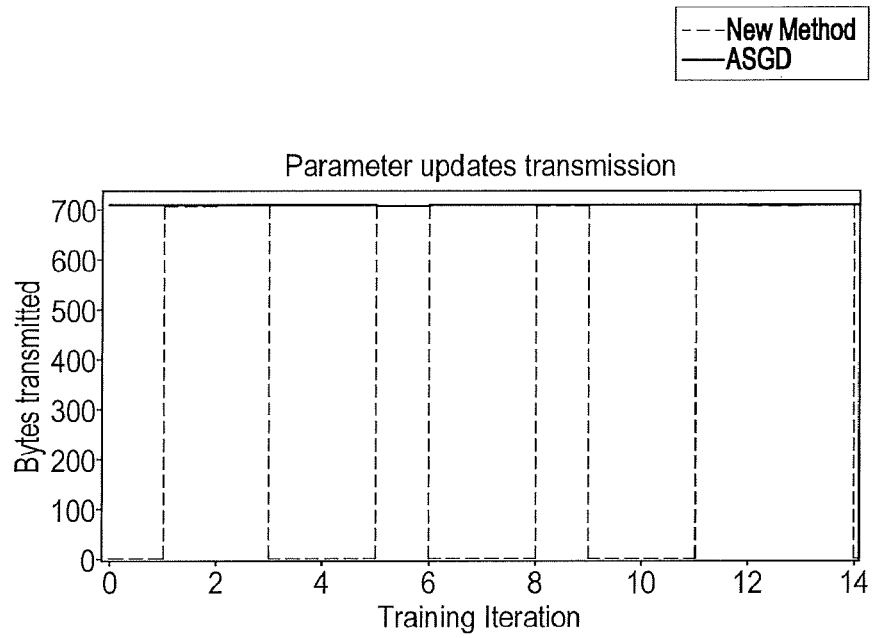
FIG. 2 illustrates a comparison of the need for update transmissions in an embodiment and a known

As can be seen from FIG. 2, whilst known asynchronous stochastic gradient descent methods (ASGD in the figures) require push of newly trained parameters from the worker to the parameter server and receipt of up-to-date global parameters after ever training iteration the embodiment (identified by the label "new method" in FIG. 2) can omit both of these data transmission steps on occasions in which the POMDP process does not deem the parameters suitable for improving the accuracy of the global DNN.

Figure 3:
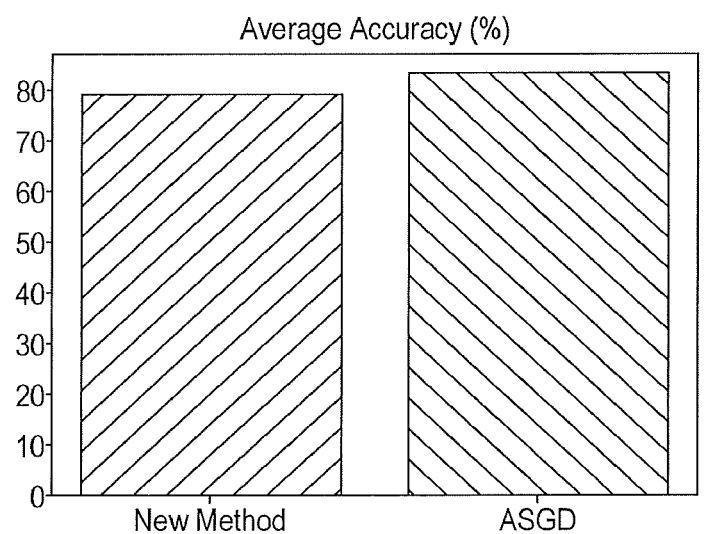
FIG. 3 illustrates Illustration of average accuracy.
Figure 4:
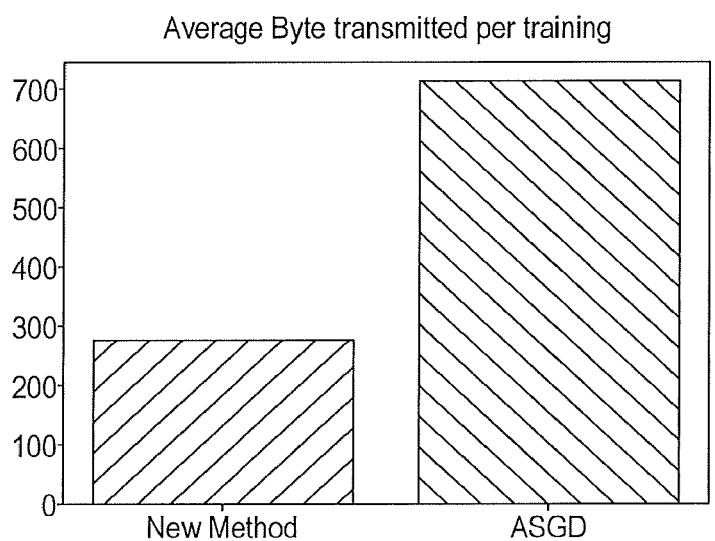
FIG. 4 illustrates Illustration of average byte transmitted.

As can be seen from the simulation results shown in FIGS. 3 and 4, the average accuracies of the method of the embodiment and known ASGD methods are comparable whilst the method of the embodiment requires transmission of significantly fewer byes than ASGD.

Figure 5:
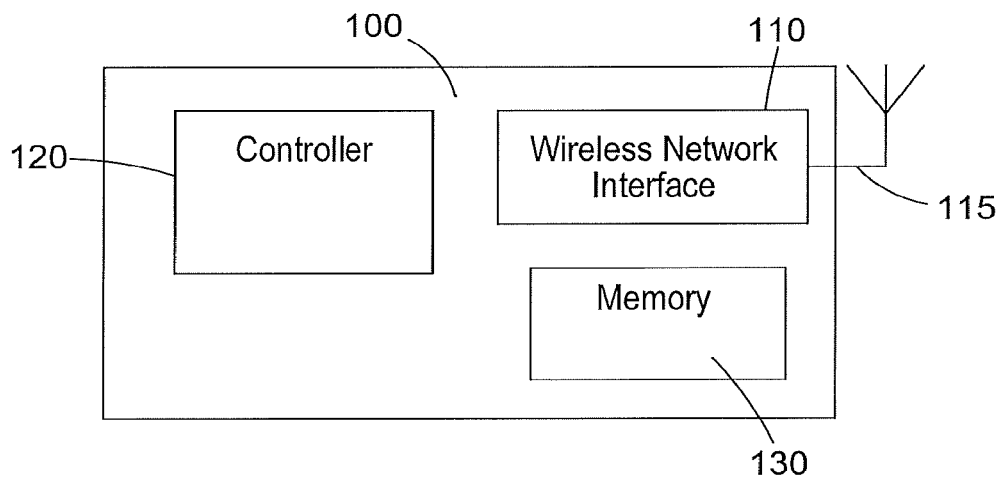
FIG. 5 shows a computing device for use in embodiments.

FIG. 5 shows an example of a computing device according to an embodiment. The computing device is capable of performing the functions of the worker or the parameter server described herein.

The computing device 100 comprises a wireless network interface 110, an antenna 115, memory 130 and a controller 120. The wireless interface 110 is configured to send and receive wireless signals via the antenna 115 to communicate with other devices, such as with the parameter server, if the computing device 100 is a worker or with the worker if the computing device 100 is the parameter server. It will be appreciated that, while the computing device 100 is shown to comprise a wireless interface 110 in other embodiments additionally or instead a wired communication connection may be provided. The controller 120 is configured to control the wireless node 100 to perform the functions described herein.

The memory 130 stores computer executable code which, when executed by the controller 120, causes the controller 120 to enact the steps described herein to transmit, receive and process data. The memory 130 may comprise a record of overheard transmissions, messages and/or scheduled transmissions.

The computing device 100 may be a worker that forms part of the Internet of Things, a mobile phone, driverless car, robot, drones or any other computing device likely to have idle processing power that may be used in a method as described above. Embodiments may particularly usefully employ mobile devices, such as the earlier mentioned driverless cars, robots or drones that cannot be relied upon having constant and reliable connection to the parameter server, for example because they have to navigate around obstacles or through complex terrain and situations.

With the increase of computational power of smart devices it is possible to perform training on edge devices without sending the raw data to a centralised server. Learning on edge devices has the benefit of low-latency inference and increased privacy but however, with increase of scalability there will be increase in communication costs (both in terms of energy consumption and in monetary terms) and a need for a reliable connection. The new method of an embodiment addresses these issues by using a method within the Reinforcement Learning group of algorithms. The algorithm assists in deciding whether the training performed by the edge devices was beneficial or not. If the training is deemed to have resulted in an improvement to the global model, then the worker transmits the updated model to the central server.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of distributed learning, the method comprising:
    receiving, from a parameter server by a local device, a global parameter set of a neural network to be trained;
    performing, by processing circuitry of the local device, a training process based on local training data and a loss function, using the received global parameter set as an initial set of parameters, thereby generating a local set of parameters of the neural network;
    determining, by the processing circuitry at the local device, whether to (1) end the training process and transmit the generated local set of parameters to the parameter server, or (2) continue the training process on the local device, the determining being based on a comparison of a current value of the loss function of the training process to a target value of the loss function determined from the received global parameter set;
    transmitting, from the local device to the parameter server the local set of parameters to the parameter server only when determining to end the training process; and
    omitting transmission of the local set of parameters to the parameter server and performing at least one further iteration of the training process on the local device using the generated local set of parameters, only when determining to continue the training process on the local device, so as to reduce a data transmission bandwidth required between the local device and the parameter server.

2. The method as claimed in claim 1, further comprising, when it is determined by the comparison of the current value to the target value to transmit the generated local set of parameters to the parameter server:
    transmitting the generated local set of parameters to the parameter server;
    receiving an updated global parameter set from the parameter server; and
    using the updated global parameter set as starting parameters in a further training process.

3. The method as claimed in claim 1, wherein the determining step further comprises, using, by the processing circuitry, a Partially Observable Markov Decision Process, and wherein the loss function or learning curve of the training process is used as an observation.

4. The method as claimed in claim 1, further comprising using, by the processing circuitry, reinforcement learning in the determining step.

5. A non-transitory data carrier comprising a computer program instructions suitable for execution by a processor, the computer program instructions, when executed by the processor, causing the processor to perform the method as claimed in claim 1.

6. A distributed learning system comprising a parameter server, a first electronic apparatus, and a second electronic apparatus, the parameter server configured to:
transmit a global parameter set of a neural network to be trained to the first electronic apparatus and the second electronic apparatus,
the first electronic apparatus including first processing circuitry configured to:
receive the global parameter set from the parameter server;
perform a first training process based on first local training data and a first loss function, based on the received global parameter set as an initial set of parameters, thereby generating a first local set of parameters of the neural network;
determine whether to (1) end the training process and transmit the generated first local set of parameters to the parameter server, or (2) continue the first training process, the determining being based on a comparison of a first current value of the first loss function of the first training process to a first target value of the first loss function determined from the received global parameter set;
transmit, from the first electronic apparatus, the local set of parameters to the parameter server only when determining to end the training process; and
omit transmission of the first local set of parameters to the parameter server and perform at least one further iteration of the training process on the first electronic apparatus using the generated first local set of parameters, only when determining to continue the first training process on the first electronic apparatus, so as to reduce a data transmission bandwidth required between the first electronic apparatus and the parameter server
the second electronic apparatus including second processing circuitry configured to:
receive the global parameter set from the parameter server;
perform a second training process based on second local training data and a second loss function, based on the received global parameter set as the initial set of parameters, thereby generating a second local set of parameters of the neural network;
determine whether to (1) end the second training process and transmit the second local set of parameters to the parameter server, or continue the second training process, the determining being based on a comparison of a second current value of the second loss function of the second training process to a second target value of the second loss function determined from the received global parameter set;
transmit, from the second electronic apparatus, the local set of parameters to the parameter server only when determining to end the training process; and
omit transmission of the second local set of parameters to the parameter server and perform at least one further iteration of the training process on the second electronic apparatus using the generated second local set of parameters, only when determining to continue the second training process on the second electronic apparatus, so as to reduce a data transmission bandwidth required between the second electronic apparatus and the parameter server.

7. The system as claimed in claim 6, wherein:
the first electronic apparatus is further configured to, when it is determined by the comparison of the first current value to the first target value to transmit the first local set of parameters to the parameter server, transmit the first local set of parameters to the parameter server, and
the parameter server is further configured to:
receive the first local set of parameters from the first electronic apparatus; and
update the global parameter set based on the received first local set of parameters.

8. An electronic apparatus, comprising:
a receiver to receive a global parameter set of a neural network to be trained from a parameter server; and
processing circuitry configured to:
perform a training process based on local training data and a loss function, using the received global parameter set as an initial set of parameters, thereby generating a local set of parameters of the neural network;
determine whether to (1) end the training process and transmit the generated local set of parameters to the parameter server, or (2) continue the training process, the determining being based on a comparison of a current value of the loss function of the training process to a target value of the loss function determined from the received global parameter set;
transmit, from the electronic apparatus to the parameter server, the local set of parameters to the parameter server only when determining to end the training process; and
omit transmission of the local set of parameters to the parameter server and perform at least one further iteration of the training process using the generated local set of parameters, only when determining to continue the training process, so as to reduce a data transmission bandwidth required between the electronic apparatus and the parameter server.

9. The electronic apparatus as claimed in claim 8, further comprising a transmitter, wherein when it is determined by the comparison of the current value to the target value to transmit the generated local set of parameters to the parameter server,
the transmitter transmits the generated local set of parameters to the parameter server,
the receiver receives an updated global parameter set from the parameter server, and
the processing circuitry is further configured to use the updated global parameter set as starting parameters in a further training process.

10. The electronic apparatus as claimed in claim 8, wherein the determining by the processing circuitry is based on a Partially Observable Markov Decision Process, and wherein the loss function or learning curve of the training process is used as observation.

11. The electronic apparatus as claimed in claim 8, wherein the processing circuitry is further configured to use reinforcement learning for the determining.

* * * * *